US012451723B2

(12) United States Patent
Martinez (10) Patent No.: US 12,451,723 B2
(45) Date of Patent: Oct. 21, 2025

(54) POWER DISTRIBUTION CONTROL (71) Applicant: Heila Technologies, Inc., Somerville, MA (US)

(72) Inventor: Jorge Elizondo Martinez, Somerville, MA (US)

(73) Assignee: Discovery Energy, LLC, Kohler, WI (US)

( * ) Notice: Subject to any disclaimer, the term of this patent is extended or adjusted under 35 U.S.C. 154(b) by 543 days.

(21) Appl. No.: 17/947,024

(22) Filed: Sep. 16, 2022

(65) Prior Publication Data

US 2023/0077967 A1    Mar. 16, 2023

Related U.S. Application Data

(60) Provisional application No. 63/244,792, filed on Sep. 16, 2021.

(51) Int. Cl.
| | |
|---|---|
| *H02J 13/00* | (2006.01) |
| *G05B 19/042* | (2006.01) |
| *H02J 3/32* | (2006.01) |
| *H02J 3/38* | (2006.01) |
| *H02M 1/42* | (2007.01) |

(52) U.S. Cl.
CPC ...... *H02J 13/00002* (2020.01); *G05B 19/042* (2013.01); *H02J 3/381* (2013.01); *H02M 1/42* (2013.01); *G05B 2219/2639* (2013.01); *H02J 3/32* (2013.01); *H02J 2300/22* (2020.01); *H02J 2300/28* (2020.01); *H02J 2300/30* (2020.01)

(58) Field of Classification Search
CPC ........ H02J 13/00002; H02J 3/381; H02J 3/32; H02J 2300/22; H02J 2300/28; H02J 2300/30; G05B 19/042; G05B 2219/2639; G05B 19/0421; H02M 1/42
See application file for complete search history.

(56) References Cited

U.S. PATENT DOCUMENTS

| | | |
|---|---|---|
| 10,892,638 B2 | 1/2021 | Martinez et al. |
| 10,903,650 B2 | 1/2021 | Martinez et al. |
| 10,971,931 B2 | 4/2021 | Martinez |
| (Continued) | | |

FOREIGN PATENT DOCUMENTS

CN          111463839 B    9/2021

OTHER PUBLICATIONS

Boyd, S., et al., "Distributed Optimization and Statistical Learning via the Alternating Direction Method of Multipliers," Foundations and Trends in Machine Learning vol. 3, No. 1, 2010, pp. 1-122.

(Continued)

*Primary Examiner* — Ziaul Karim
(74) *Attorney, Agent, or Firm* — The Belles Group, P.C.

(57) ABSTRACT

A method for operating a microgrid using a distributed energy resource (DER) controller determines an output power value of a DER. The method also receives a remote power correction value from a second DER controller. The method further determines a local output power reference value as a function of the output power value and the remote power correction value. The method further determines a frequency set point as a function of the local output power reference value and a droop coefficient. The method further adjusts an output frequency of the DER as a function of the frequency set point.

15 Claims, 9 Drawing Sheets

(56) References Cited

U.S. PATENT DOCUMENTS

| | | | |
|---|---|---|---|
| 11,404,907 B2* | 8/2022 | Razeghi-Jahromi | H02J 3/18 |
| 2010/0207456 A1* | 8/2010 | Lasseter | H02J 3/38 |
| | | | 307/85 |
| 2014/0074311 A1 | 3/2014 | Kearns et al. | |
| 2015/0039145 A1* | 2/2015 | Yang | G05B 13/02 |
| | | | 700/291 |
| 2019/0258212 A1* | 8/2019 | Morton | H02J 3/46 |
| 2020/0175617 A1* | 6/2020 | Martinez | G06Q 20/0855 |
| 2021/0159726 A1* | 5/2021 | Razeghi-Jahromi | |
| | | | G05B 13/042 |
| 2021/0175709 A1 | 6/2021 | Martinez et al. | |
| 2021/0234398 A1* | 7/2021 | Morton | H02J 9/068 |
| 2022/0247179 A1* | 8/2022 | Orihashi | B60L 53/63 |

OTHER PUBLICATIONS

Butenko, S., et al., Recent Developments in Cooperative Control and Optimization, Boston: Kluwer Academic Publishers, 2004.

Chen, Z., et al., "To Centralize or to Distribute: That Is the Question: A Comparison of Advanced Microgrid Management Systems," IEEE Industrial Electronics Magazine, vol. 12, No. 1, pp. 6-24, 2018.

Davin, J., et al., "Impact of Problem Centralization in Distributed Constraint Optimization Algorithms," in AAMAS 4th International Join Conference on Autonomous Agents and Multiagents Systems, 2005, 7 pages.

De Brabandere, K., et al., "A Voltage and Frequency Droop Control Method for Parallel Inverters," IEEE Transactions on power electronics, vol. 22, No. 4, pp. 1107-1115, 2007.

International Search Report and Written Opinion for International Application No. PCT/US2022/043895, mailed Dec. 28, 2022, 6 pages.

Kroposki, B., et al., "Development of a High-Speed Static Switch for Distributed Energy and Microgrid Applications," In Power Conversion Conference, Nagoya, 2007, 6 pages.

Lidula, N., et al., "Microgrids research: A review of experimental microgrids and test systems," Renewable and Sustainable Energy Reviews vol. 15, No. 1, pp. 186-202, 2011.

Lu, X., et al., "State-of-Charge Balance Using Adaptive Droop Control for Distributed Energy Storage Systems in DC Microgrid Applications," IEEE Transactions on Industrial Electronics, vol. 61, No. 6, pp. 2804-2815, 2013.

Lundstrom, B., "Considerations for Microgrid Co-Design: Performance Verification Approach, Metrics and Interoperability," in ARPA-E EMC2 Workshop, 2020, 22 pages.

National Renewable Energy Laboratory, "Basic Research Needs for Autonomous Energy Grids—Summary Report of the Workshop on Autonomous Energy Grids: Sep. 13-14, 2017," Technical Report NREL/TP-5D00-70428, Golden, CO, 2017, 27 pages.

National Renewable Energy Laboratory, "From the Bottom Up: Designing a Decentralized Power System," NREL.gov, 2019. [Online]. Available: https://www.nrel.gov/news/features/2019/from-the-bottom-up-designing-a-decentralized-power-system.html, 8 pages.

Nudell, T., et al., "A Dynamic Market Mechanism for Combined Heat and Power Microgrid Energy Management," IFAC PapersOnLine, vol. 50, No. 1, pp. 10033-10039, 2017.

Olivares, D., et al., "Trends in microgrid control," IEEE Transactions on Smart Grid, vol. 5, No. 4, pp. 1905-1919, 2014.

Rahbari-Asr, N., et al., "Cooperative Distributed Scheduling for Storage Devices in Microgrids Using Dynamics KKT Multipliers and Consensus Networks," in IEEE Power and Energy Society General Meeting, 2015, 5 pages.

Wang, T., et al., "Dynamic Control and Optimization of Distributed Energy Resources in a Microgrid," IEEE Transactions on Smart Grid, vol. 6, No. 6, pp. 2884-2894, 2014.

Examiner Harri Maki-Mantila, Extended European Search Report, European Patent Application EP 22 87 0789, Completed Jun. 8, 2025, 9 pp.

* cited by examiner

Fig. 9

POWER DISTRIBUTION CONTROL

PRIORITY

This patent application claims priority from provisional U.S. patent application No. 63/244,792, filed Sep. 16, 2021, entitled, "DECENTRALIZED ALGORITHMS FOR RESILIENT AND AUTOMATED DER SYSTEMS," and naming Jorge Elizondo Martinez as the inventor, the disclosure of which is incorporated herein, in its entirety, by reference.

FIELD

Illustrative embodiments of the invention generally relate to power systems and, more particularly, various embodiments of the invention relate to distributed energy resource control.

BACKGROUND

The electric utility grid connects homes, businesses, and other buildings to power sources. This interconnectedness requires control and planning, since grid vulnerabilities can cascade quickly across the network. Aggregated distributed energy resources ("DERs") systems ("DERs Systems"), may be used to form grid subsystems known as microgrids. Microgrids include controlled clusters of electricity generation and storage equipment, as well as loads that can provide power to the utility grid and can also operate disconnected from the main grid. This increases the efficiency and reliability of the utility grid as well as the microgrid.

The US Department of Energy provides a formal definition of a microgrid as a group of interconnected assets, including loads and distributed energy resources, with clearly defined electrical boundaries that acts as a single controllable entity with respect to the grid. A microgrid often has distributed generators (e.g., diesel generators, gas turbines, etc.), batteries, as well as renewable resources like solar panels or wind turbines.

SUMMARY OF VARIOUS EMBODIMENTS

In accordance with one embodiment of the invention, a method for operating a microgrid determines, with a first distributed energy resource (DER) controller, an output power value of a DER. The method receives, with the first DER controller, a remote power correction value from a second DER controller. The method determines, with the first DER controller, a local output power reference value as a function of the output power value and the remote power correction value. The method determines, with the first DER controller, a frequency set point as a function of the local output power reference value and a droop coefficient. The method adjusts, with the first DER controller, an output frequency of the DER as a function of the frequency set point.

In some embodiments, determining the local output power reference value includes determining a global power correction value as a function of a local power correction value and the remote power correction value, and determining the local output power reference value as a function of the global power correction value and the output power value.

The method may determine a local power correction value as a function of the output power value and a previous local output power reference value and transmitting the local power correction value to the second DER controller. The method may also determine, with the second DER controller, a second local output power reference value as a function of an output power of a second DER and the local power correction value from the first DER controller. The method may also determine, with the second DER controller, a second frequency set point as a function of the second local output power reference value and a second droop coefficient, and adjust, with the second DER controller, a second output frequency for the second DER as a function of the second frequency set point.

The remote power correction value may include an aggregation of a power correction values determined by the DER controller transmitting the remove power correction value, as well as one or more PCC or DER controllers.

The method may operate, with the second DER controller, the second DER of the microgrid using the second output frequency while operating, with the first DER controller, the first DER of the microgrid using the first output frequency. In some embodiments, adjusting the first output frequency and adjusting the second output frequency includes operating the first DER according to the first frequency set point and operating the second DER according to the second frequency set point.

In some embodiments, the method transmits, using a point of common coupling power converter, power between the microgrid and a power system such that adjusting the first output frequency and adjusting the second output frequency occurs while transmitting power between the microgrid and a utility grid.

In some embodiments, determining the frequency set point includes using an equation having the local output power reference value, $P^*_i$; the droop coefficient, $m_{pi}$; output frequency of the DER, $f$; and the frequency set point, $f_{0i}$.

Illustrative embodiments are implemented as a microgrid system including a DER controller having an input/output device configured to communicate with a plurality of microgrid controllers; at least one processing device, and a memory device configured to store instructions. When executed by the at least one processing device, the instructions are configured to determine an output power value of a DER and receive a remote power correction value from a second DER controller. The instructions are then configured to determine a local output power reference value as a function of the output power value and the remote power correction value. The instructions are then configured to determine a frequency set point as a function of the local output power reference value and a droop coefficient and adjust an output frequency of the DER as a function of the frequency set point. In some embodiments, the system includes the first DER corresponding to the first DER controller; the second DER controller; and a second DER corresponding to the second DER controller. In some embodiments, the system includes a point of common coupling power converter configured to transmit power between the microgrid and a power system.

Illustrative embodiments are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a microgrid uses a decentralized process to regulate power distribution by operating multiple distributed energy resources (DERs) of the microgrid as grid-forming nodes. DER controllers exchange data with other DER controllers to determine a power reference value for a corresponding DER. Using the power reference value, each DER controller determines a frequency set point by which to operate its corresponding DER. Collectively, the DER controllers of the microgrid may regulate the voltage and frequency of the microgrid without a central controller and without a solitary grid-forming node. Details of illustrative embodiments are discussed below.

Power systems, such as a utility grid, are increasingly incorporating power sources that are distributed throughout the power system, also known as distributed energy resources (DERs). The incorporation of DERs allows the power system to be divided into subsystems capable of independent control, also known as microgrids. Generally, a microgrid is coupled to the rest of the power system at a point of common coupling (PCC) and includes at least one DER that provides power and at least one load that consumes power. The microgrid also includes at least one controller to determine set points for each DER and regulate power characteristics within the microgrid. For example, some microgrid systems may use a central controller to collect data and determine set points for each DER.

To regulate voltage and frequency of the microgrid, one node, such as the PCC or a DER, operates as a grid-forming node, outputting power based on a voltage set point and frequency set point. The remaining DERs become grid-following nodes, and output power based on active power/reactive power set points. In the event the central controller or grid-forming node malfunction, the microgrid may be shut down and disconnected from the rest of the power system, eliminating power distribution in the microgrid and destabilizing the rest of the power system.

Figure 1:
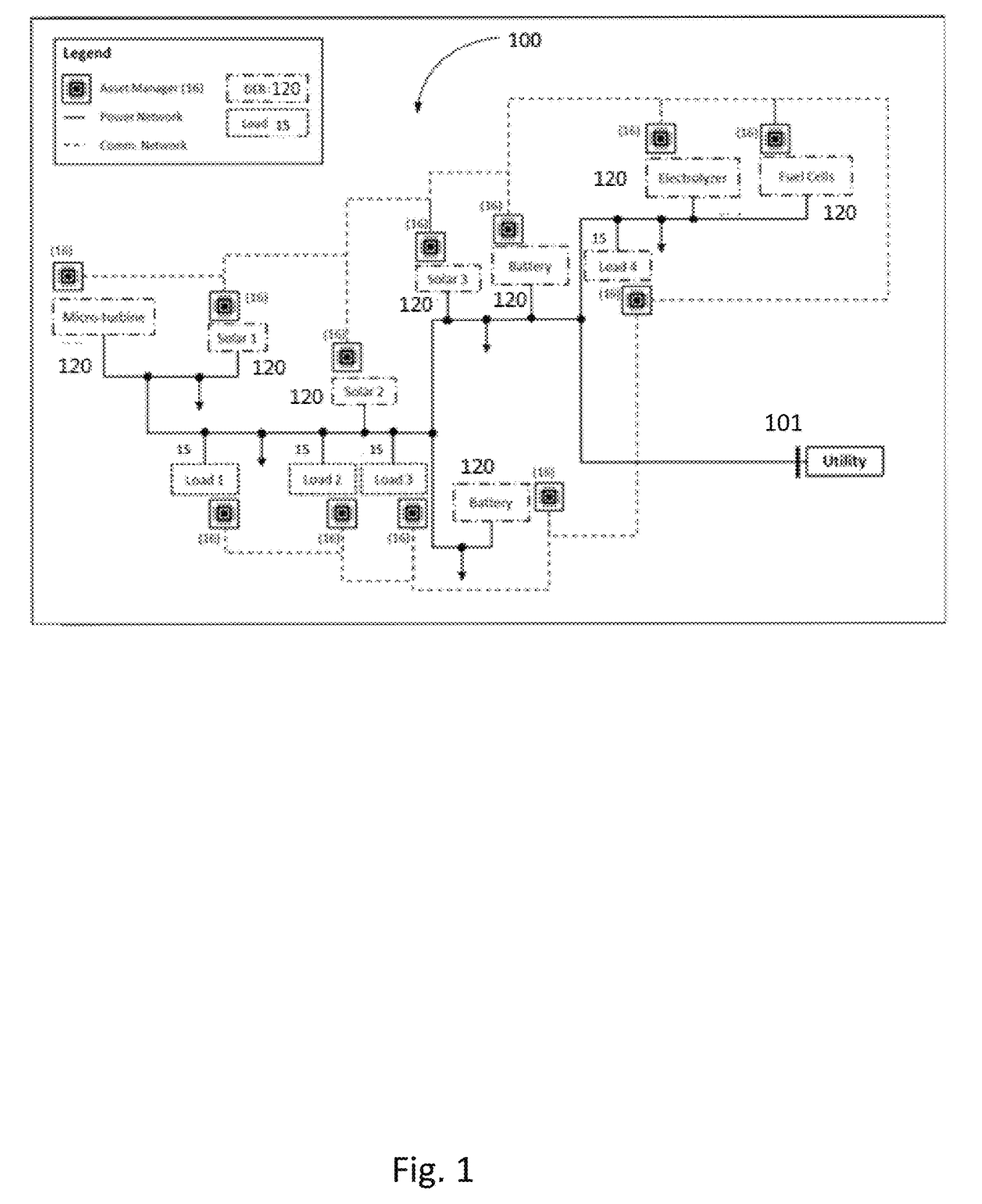
FIGS. 1-2 schematically show examples of a microgrid in accordance with various embodiments.

FIG. 1 schematically shows a DERs system 100A, also known as a microgrid, including asset managers 16 that are used control the operation of a plurality of distributed energy resources (DERs) 14 and loads 15 to fulfill a system-wide objective in accordance with illustrative embodiments of the invention. As known by those of skill in the art, the DER 14 exchanges real and reactive power with the power network. In contrast, the load 15 generally consumes or uses real and reactive power. The DER 14 may be, among other things, solar, micro-turbine, battery, fuel cells, electrolyzer, etc. Although there are distinctions between loads 15 and DERs 14, together both loads and DERs may be referred to as assets.

In some embodiments, each of the DERs 14 and loads 15 is controllable by a given asset manager 16 (Additionally, or alternatively, a plurality of the DERs 14 may be controlled by a single asset manager 16). However, in some embodiments, one or more DERs 14 and/or loads 15 may not be coupled with the asset manager 16. When referring specifically to the type of asset, the asset manager 16 may be a DER controller, or the asset manager 16 may be a load controller. While the DER controller controls the operation of at least one DER 14, the DER controller may, in some embodiments, control the operation of one or more loads 15.

Figure 2:
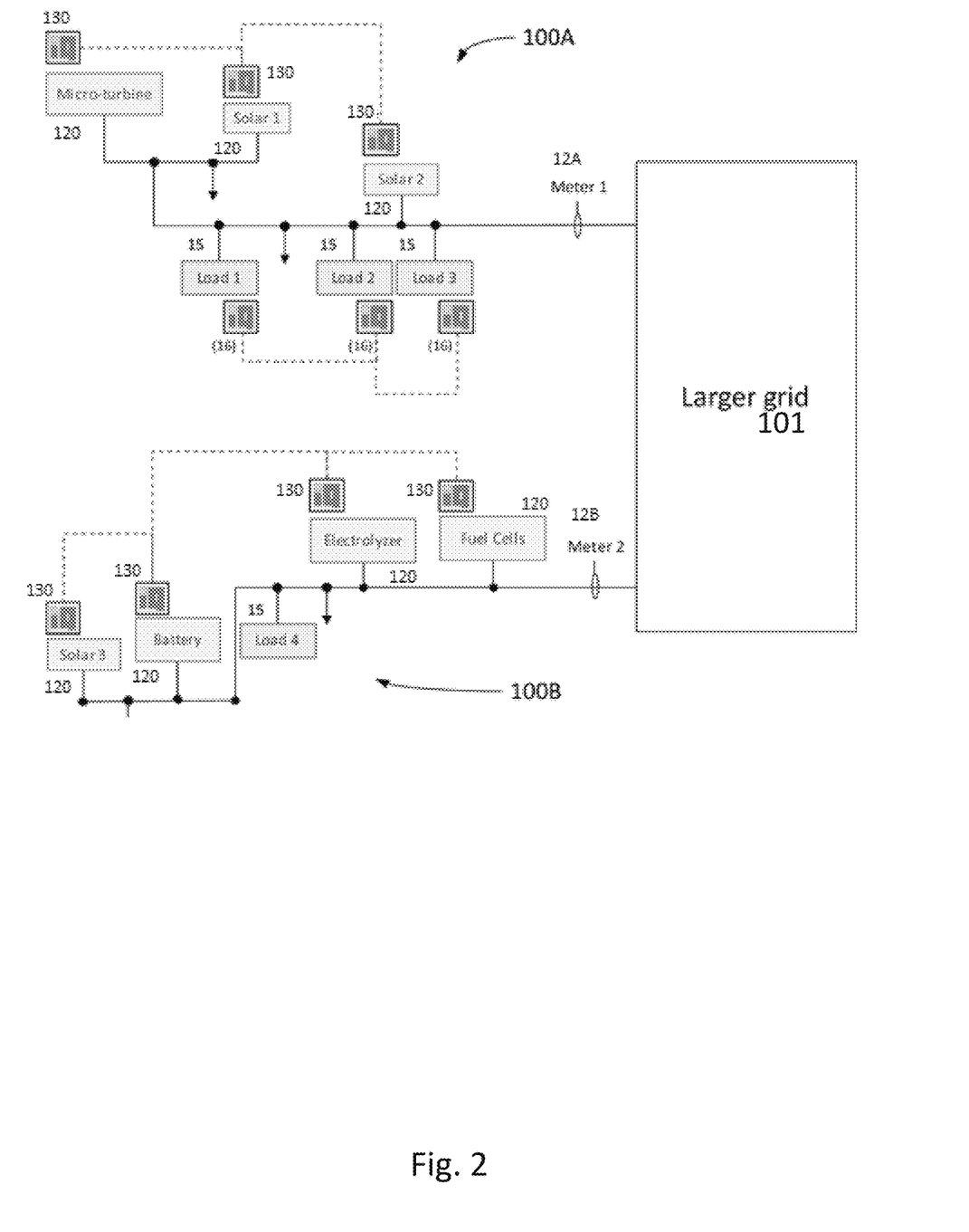

FIG. 2 schematically shows two DERs networks 100A and 100B. Each of the networks 100B and 100A has a branch of common coupling 12A and 12B. A virtual branch of common coupling may be calculated for two independent DERs systems 100A and 100B in accordance with illustrative embodiments of the invention. The virtual branch of common coupling is formed by combining meter information from the branches of common coupling 12 of two or more independent aggregated DERs systems 100A and 100B (e.g., 12A and 12B). For example, the real power at the virtual branch of common coupling is the sum of real power measured by meter 1 at the branch of common coupling 12A and the real power measured by meter 2 at the branch of common coupling 12B. Accordingly, any discussion relating to the branch of common coupling 12 also applies to the virtual branch of common coupling unless the context otherwise requires.

As discussed below, in various embodiments, one or more of the DERs systems 100B and 100A may be controlled using a decentralized approach. For example, each DER 120 may have a respective asset controller 16 (i.e., a DER controller 130). DERs systems 100 are deployed across the world in a global effort to modernize power systems and make them more sustainable, resilient and efficient. Various embodiments provide a distributed architecture where every consumer can be a producer and proactively participate in power procurement, utilization and dispatch. As the number of stakeholders in the energy infrastructure increases, a problem arises in determining the role of utilities and how to handle trade-offs between the individual and the collective goals of the grid.

Illustrative embodiments provide an end-to-end solution that converts DERs into intelligent agents that interact and create systems with emergent behavioral properties that meet the collective needs of the system 100. Illustrative embodiments achieve this by using local control and decentralized optimization techniques, which leverage concepts from game theory, distributed optimization methods and machine learning.

Illustrative embodiments allow the DERs 14 to be the fundamental building block of the grid and create systems 100 from the ground up by having DERs 14 interact and coordinate. DERs systems 100 are built organically and scale as the needs of the system 100 changes, providing resilience and flexibility to accommodate inevitable changes like the addition of intermittent renewable generation, the electrification of transportation with EVs, and the introduction of novel storage technologies.

When it comes to managing DER systems, there are two general approaches:

Centralized top-down approach: A single controller, typically located away from the DERs, collects information and data from all assets in the system. The centralized controller processes it and calculates the optimal dispatch strategy for each DER in order to achieve a common goal.

Decentralized, bottom-up approach: Control is collocated with each DERs to provide each DER 14 with decision-making capabilities so that the DERs system 100 goal can be obtained by the collaboration of the different DERs 14 and loads 15. A distributed/decentralized system enables assets to share data and resources more efficiently by exchanging less overall information and by limiting the scope of objectives and constraints.

The centralized approach undesirably requires complex data to flow up and down the system hierarchy, and has a single point of data processing and decision-making. As the number of variables and nodes increases, the problem becomes overly complex. Furthermore, the associated latencies and delays caused by the communication network can have an impact on the performance of DERs 14 of illustrative embodiments. These limitations have led to the abundance of "pilot projects" unable to scale beyond niche applications, and typically with high costs.

In contrast, the inventors have determined that decentralized control of the assets is inherently easier to scale and represents a more natural way to construct DERs systems 100. Advantages of the decentralized approach include:
1) Intelligence that grows as the system grows. Every time an agent (DER or controllable device) is installed in the grid, a new point of data processing and decision-making is added, so that the system capabilities increase over time.
2) Simple message exchange. Because decisions are local on an agent-by-agent basis, the messages that need to be communicated are much simpler and can be done peer-to-peer. For example, no single asset manager 16 needs to have information regarding the energy available in every battery in the system 100.
3) System architecture agnostic. More DERs and stakeholders lead to a larger diversity of configurations that need to be catered for, something that decentralized algorithms can easily adapt to as the local decisions are only indirectly affected by other agents or their location.
4) Rapid response. Autonomous DERs are able to respond rapidly and efficiently to local situations that impact the larger grid, balancing the system before problems escalate to cause larger system-wide events that a system operator (such as an ISO) needs to respond to.
5) Technology agnostic. Agents can hide the complexity of their underlying DER, making a level playing field for any type of energy storage, generation or load control.

Figure 3A:
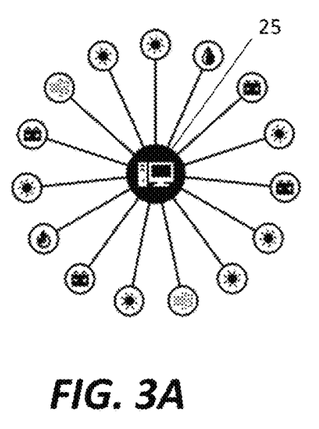
FIGS. 3A-3C schematically show an example of a microgrid control architecture in accordance with various embodiments.
Figure 3B:
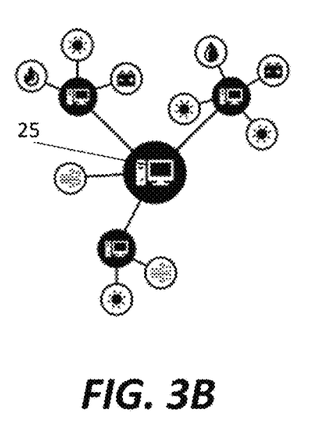
Figure 3C:
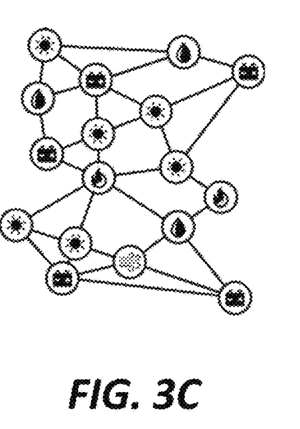

FIGS. 3A-3C schematically show three. In both FIGS. 3A and 3B a central controller 25 calculates the price (also referred to as correction values), and/or the set-point for the DERs. Calculation of the signal and/or the set-points of the DERs is known to those skilled in the art, and is further described in U.S. Pat. No. 10,903,650, which is incorporated herein by reference in its entirety.

FIG. 3A schematically shows a single centralized approach, where all the calculations, such as calculating set-points, are performed by the central controller 21 (also referred to as a central agent 25). FIG. 3B schematically shows a distributed approach, where the optimization is achieved through the implementation of the dual-decomposition method or some other distributed optimization approach. For the DERs system 100, the distributed approach is more scalable, modular, secure, and reliable than the fully centralized one shown in FIG. 3A. However, the distributed approach of FIG. 3B relies on a central agent to act as a coordinator and perform some tasks such as calculating the dual variables, also known as correction values. Thus, in a distributed system, one or more nodes distribute work to sub-nodes.

The inventor recognized that the dual-decomposition shown in FIG. 3B has a number of disadvantages, namely:
Requires a central agent 25.
It has a single point of failure, as it only works if the central agent 25 is functional. For example, if the central controller 25 is down, the optimization of the system 100 does not function. Additionally, if the central controller 25 becomes compromised, the correction values sent to every asset is compromised.
Requires that every asset trust the central agent 25. For example, if the DERs system 100 spans a neighborhood where every asset is with a different homeowner, it is difficult to determine which home owner should be the authority.

FIG. 3C schematically shows the system 100 where the correction values and frequency set points are calculated by one or more of the DERs 14 in accordance with illustrative embodiments of the invention. Because the DERs 14 calculate the price (also referred to as power correction values), a dedicated central agent 25 is not required. Thus, in various embodiments of the innovation, the need for a dedicated central agent is removed. In some embodiments, the decentralized system has nodes (e.g., assets and/or asset managers 16) that communicate directly with other peers (e.g., instead of through a node/sub-node distributed arrangement). Various embodiments advantageously solve one or more of the following vulnerabilities associated with centralized DERs systems 100.

In particular, where the centralized controller 25 calculates the correction values, none of the DERs controllers can calculate set points (e.g., using their local function) when the centralized controller 25 is down. Instead, various embodiments may calculate set points without the use of the central controller 25. This includes, among other things, a rotating scheme for determining the correction values, a correction values consensus scheme for determining a correction values, and a transaction consensus scheme for determining the correction values. These methods for determining the correction values without the central controller 25 are described in U.S. patent application Ser. No. 16/702,505, which is incorporated herein by reference in its entirety.

Additionally, or alternatively, illustrative embodiments solve another vulnerability associates with traditional DERs systems 100. When microgrids operate, there is a voltage and frequency in the lines. The point in the network where voltage and frequency are set is known as the "grid-forming node". The grid forming node may also be referred to as a master node or a slack boss. Most systems have one node that generates a voltage and frequency, while DERs in other nodes just inject power into an existing voltage. The grid-forming node can be the grid interconnection point or a DER. The single grid forming node provides a vulnerability to the grid, such that when the grid forming node is down, the source of voltage and frequency is removed, causing all DERs to disconnect, or, in some cases, leading to dangerous overvoltage.

Using the grid interconnection point as the grid-forming node is an indication of a top-down approach to microgrids, which still depends on the large power plants as the grid-forming root sources and, essentially, connects DERs from all microgrids together during normal operation. This architectural decision causes difficulties in the creation of proper regulations and rules for microgrids as utilities need to account for the characteristics of all DERs that are connected in every microgrid.

Figure 4:
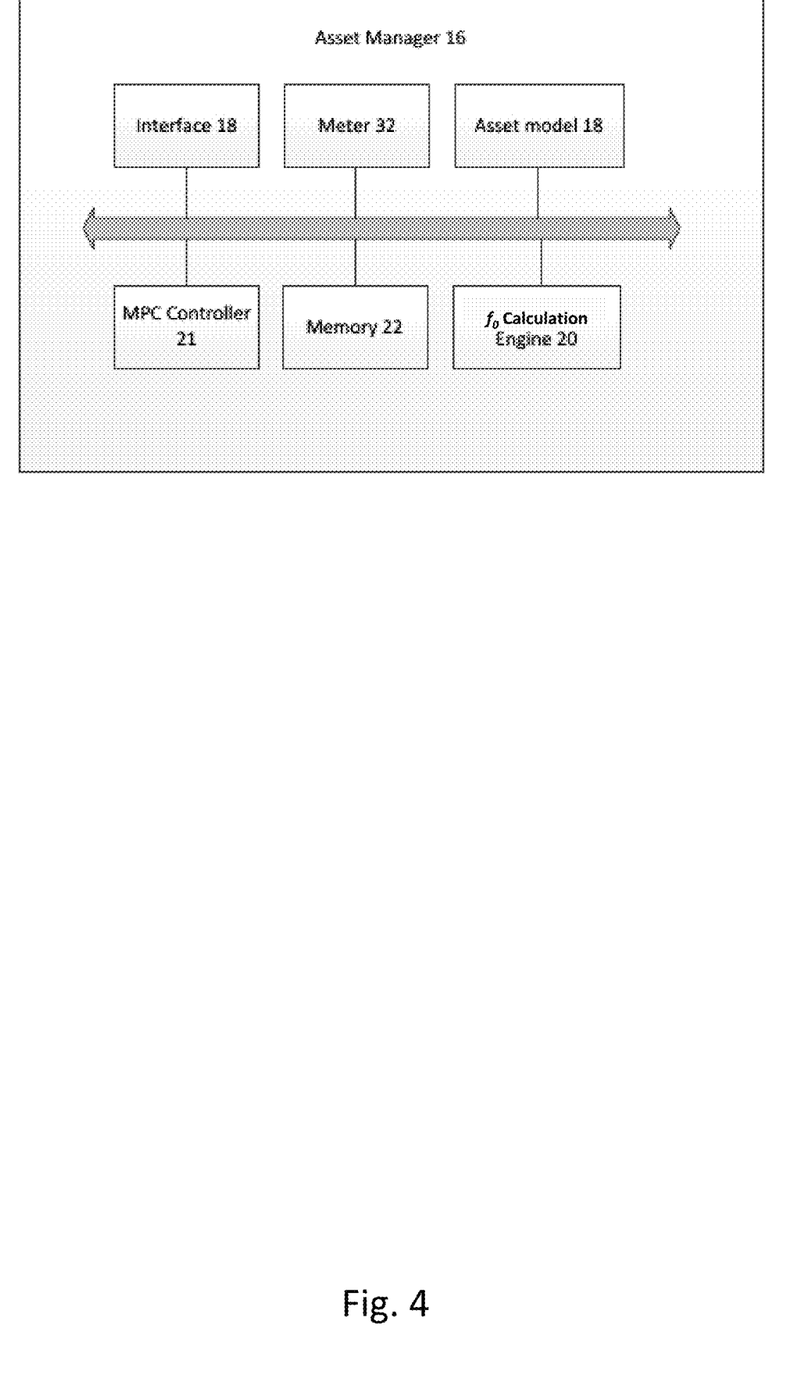
FIG. 4 schematically shows an example of an asset manager in accordance with various embodiments.

FIG. 4 schematically shows a DER controller or PCC controller configured in accordance with various embodiments. As shown, the DER controller of FIG. 4 has a plurality of components that together perform some of its functions. Each of these components is operatively connected by any conventional interconnect mechanism. FIG. 4 simply shows a bus communicating with each of the components. Those skilled in the art should understand that this generalized representation can be modified to include other conventional direct or indirect connections. Accordingly, discussion of a bus is not intended to limit various embodiments. The DER controller of the present disclosure may include some or all of the components in the asset manager 16 described in U.S. Pat. Nos. 10,903,650, and 10,971,931, each of which is incorporated herein by reference in its entirety.

Indeed, it should be noted that FIG. 4 only schematically shows each of these components. Those skilled in the art should understand that each of these components can be implemented in a variety of conventional manners, such as by using hardware, software, or a combination of hardware and software, across one or more other functional components. For example, the controller may be implemented using a plurality of microprocessors executing firmware. As another example, the controller may be implemented using one or more application specific integrated circuits (i.e., "ASICs") and related software, or a combination of ASICs, discrete electronic components (e.g., transistors), and microprocessors. Accordingly, the representation of the controller and other components in a single box of FIG. 4 is for simplicity purposes only. In fact, in some embodiments, the controller of FIG. 4 is distributed across a plurality of different machines—not necessarily within the same housing or chassis.

The asset manager 16 includes a model predictive control (MPC) controller 21 configured to, among other things, use local cost functions to manage operation of its asset(s) 14, and determine an operating point. For example, the operating point of the DER 14 may including the output frequency that the DER 14 is injecting into the microgrid 100. The operating point may also include all the internal state variables of the DER 14, such as temperatures, stored energy, voltages, etc.

The asset manager 16 may also include a frequency set point calculation engine 20 to determine a frequency set point for the power output to the microgrid 100 by the asset. The frequency set point calculation engine 20 controls its given asset to output power at a given frequency. To that end, the frequency set point calculation engine 20 may be perform the process 600 as shown and described with respect to FIG. 6.

The asset manager 16 also includes an interface 18 to communicate with other assets and/or other devices. For example, the interface 18 is configured to communicate with other asset managers 16 (e.g., to send and/or receive the power correction values).

The asset manager 16 may also include a memory 22 for storing DER 14 data, an asset model 18 used to emulate the behavior of any asset, such as diesel generators, gas turbines, batteries, solar panels, wind turbines, loads, etc. Each of these components and other components cooperate to perform the various discussed functions.

It should be reiterated that the representation of FIG. 4 is a significantly simplified representation of an actual asset manager 16. Those skilled in the art should understand that such a device may have many other physical and functional components, such as central processing units, communication modules, protocol translators, sensors, meters, etc. Accordingly, this discussion is in no way intended to suggest that FIG. 4 represents all the elements of an asset manager 16.

Figure 5:
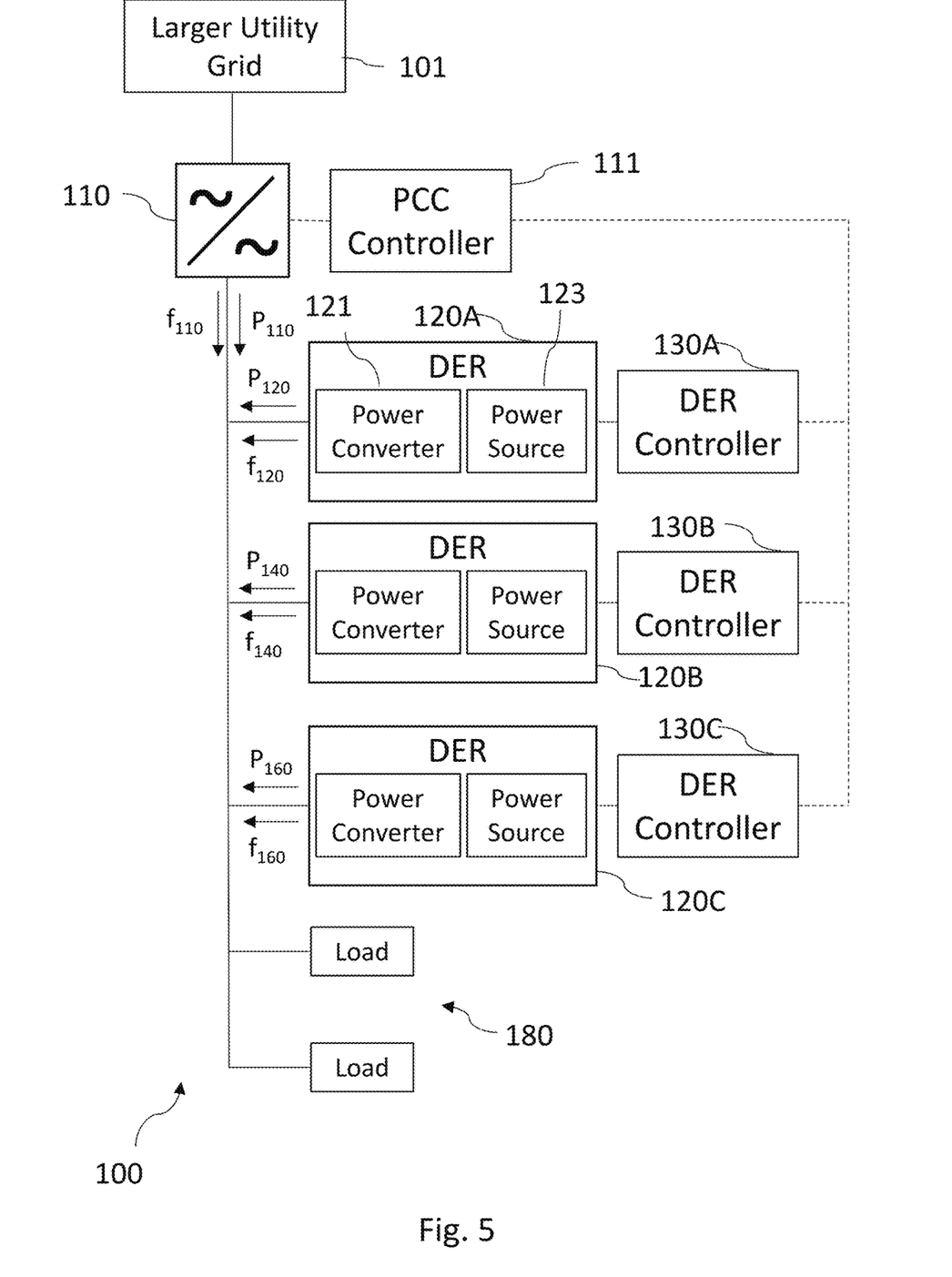
FIG. 5 schematically shows an example of a microgrid in accordance with various embodiments.

FIG. 5 schematically shows a detailed view of an example of the microgrid 100 in accordance with illustrative embodiments. The microgrid 100 may generate, consume, and regulate power. The microgrid 100 may be a subsystem of a larger utility grid 101. In various embodiments, the microgrid 100 and the larger utility grid 101 transmit power between them. The microgrid 100 may be implemented in a variety of applications, including utility power systems, fleet power systems, vehicular power systems, marine vessel power systems, aerial power systems, or building power systems, among other things. The topology of the microgrid 100 is illustrated for discussion purposes and is not intended to limit various embodiments. For example, the microgrid 100 may include more or fewer loads, more or fewer DERs, and/or fault protection devices. Although the microgrid 100 is illustrated with a single line diagram, the microgrid 100 may transmit single phase alternating current, multiphase alternating current, or direct current.

The point where the microgrid 100 is coupled to the larger utility grid 101 is referred to as the point of common coupling. The microgrid 100 includes a point of common coupling (PCC) AC/AC power converter 110 configured to convert power transmitted between the microgrid 100 and the larger utility grid 101. The microgrid 100 includes a PCC controller 111 configured to communicate with other controllers of the microgrid 100 and to operate the PCC AC/AC power converter 110 according to a frequency set point and a voltage set point. In some embodiments, the PCC AC/AC power converter 110 is a back-to-back converter or a solid-state transformer.

The microgrid 100 includes a DER 120A, a DER 120B, and a DER 120C, each configured to provide power to the microgrid 100 with power characteristics determined by set points, such as a frequency set point or a voltage set point. Like DER 120B and 120C, the DER 120A includes a power source 123 configured to generate or store power. Among other things, the power source 123 may include a solar panel, a solar array, a battery, battery bank, a capacitor bank, a wind turbine, a hydroelectric generator, a diesel generator, or a natural gas generator.

The DER 120A also includes a power converter 121 configured to receive power from the power source 123, convert the power, and output the power to the microgrid 100. In some embodiments, the power converter 121 may be bidirectional, such as where the power source 123 is configured to store power that may later be provided to the microgrid 100. The power output from the DER 120A by the power converter 121 has power characteristics, such as an output power magnitude $P_{120A}$ and an output frequency $f_{120A}$. The power converter 121 is configured to output power according to a set point. For example, the power converter 121 may be configured to output power with a given frequency corresponding to an output frequency set point, and configured to output power with a given voltage corresponding to an output voltage set point. The power converter 121 may be any type of power converter configured to convert the power received from the power source 123 to the power distributed by the microgrid 100. It should be appreciated that the features of DER 120A may be present in the other DERs of microgrid 100.

The microgrid 100 includes DER controllers 130 each configured to operate one of the DERs of the microgrid 100. For discussion purposes, FIG. 5 schematically shows three DER controllers 130: the DER controller 130A operates DER 120A, the DER controller 130B operates the DER 120B, and the DER controller 130C operates the DER 120C. In some embodiments, the DER controller 130 of microgrid 100 may be configured to control more than one DER.

Each DER controller of the microgrid 100 may be configured to determine power characteristics of a corresponding DER, exchange local information with other controllers of microgrid 100, and operate the corresponding DER to output power having an output frequency based on a frequency set point determined by the DER controller using the exchanged local information.

For example, the DER controller 130A may include measuring devices, such as voltage or current sensors, to measure power characteristics of the DER 120A to determine output active power magnitude and output frequency, among other things. The DER controller 130A may then determine a local power reference value using the local measurements and power correction information from DER controllers 130B and 130C. With the power reference value, the DER controller 130A may then determine a frequency set point for DER 120A. The other DER controllers 130B and 130C, as well as PCC controller 111 perform similar steps such that all controllers determine a frequency set point for a corresponding power converter. The microgrid controllers (i.e., the DER controllers 120A and the PCC controller 111) then operate their respective power converters to provide power to the microgrid 100 according to the corresponding frequency set points. In this way, the DER and PCC controllers of the microgrid 100 regulate the microgrid 100 power using a decentralized architecture, controlling each of the DERs and PCC as grid-forming nodes, thereby avoiding a single point of failure for a control agent and a grid-forming node.

The microgrid 100 includes a plurality of loads 180 configured to consume power provided by the microgrid 100. The plurality of loads 180 may include any device configured to receive and consume power from the microgrid 100. It should be appreciated that features of the microgrid 100 may be present in other microgrids disclosed herein.

Figure 6:
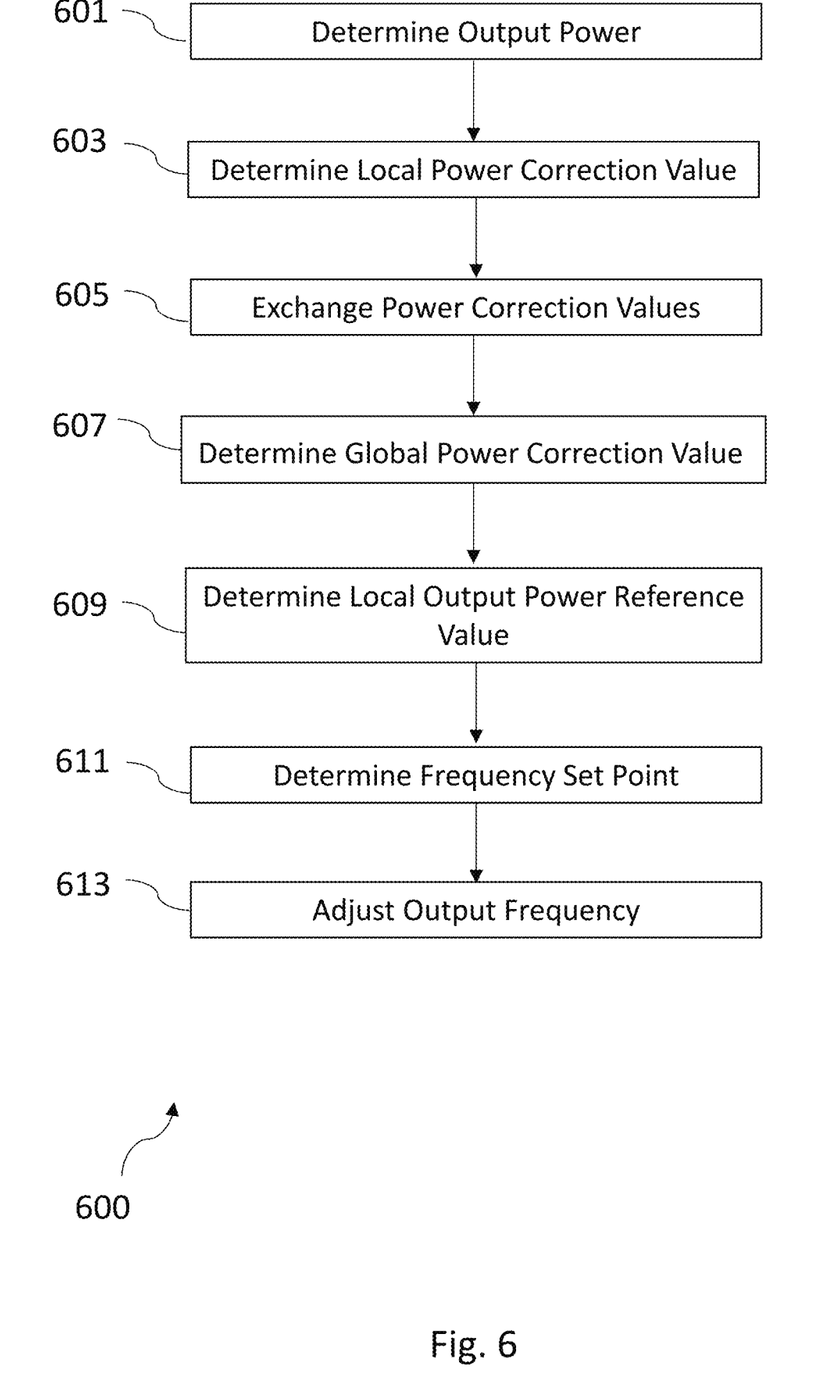
FIG. 6 shows an example of a process for controlling a power system in accordance with various embodiments.

FIG. 6 shows a process 600 for controlling a power system, such as the microgrid 100 of FIG. 5 or the networked microgrid structure 300 in accordance with various embodiments. While process 600 is described below as implemented by the DER controller 130A, process 600 may be performed simultaneously by the DER controllers 130A, 130B, 130C and/or the PCC controller 111 of microgrid 100. It shall be further appreciated that a number of variations and modifications to process 600 are contemplated including, for example, the omission of one or more aspects of process 600, the addition of further conditionals and operations, or the reorganization or separation of operations and conditionals into separate processes. For example, operations 603, 605, 607, and 609 may be replaced with an alternative process for determining a local output power reference value using aggregated information from the microgrid controllers.

Process 600 begins at operation 601 where the DER controller 130A determines output power values corresponding to the power output by DER 120A. Determining output power values may include measuring output power characteristics, such as voltage and current, and then calculating a value using the measurements. For example, the output power values may include an output active power value, or an output frequency.

Using the output power values, the DER controller 130A determines a correction to the power output of DER 120A based on a deviation between the actual power output of DER 120A and the desired power output of DER 120A, also known as a local power correction value. In some embodiments, the local power correction value may be determined using the following formula, where i is the index number of a single DER (in this case, the DER 120A), t is the iteration number of the equation (i.e. t referring to a previous iteration and t+1 referring to the current iteration), $p_i^{t+1}$ is the current local power correction value for DER 120A, $p^t$ is the most recent global power correction value, $\alpha$ is a gain, $P_i$ is the local output power value, such as the active power, for the DER 120A, and $P^*_i$ is the local output power reference value.

$$p_i^{t+1} = p^t + \alpha(P_i - P^*_i) \tag{1}$$

For the first iteration of operation 605, $p^t$ may be assigned an initial value rather than calculated using equation (2). Among other things, the assigned value could be zero or a historical local power correction value. $\alpha$ is configured to limit the magnitude of the correction to reduce power oscillation. In some embodiments, $\alpha$ may be a value configured to be low enough to avoid overshoot and high enough to avoid a prolonged convergence. In one example, $\alpha$ may be determined by linearizing the system and finding a value of $\alpha$ that will produce a critically damp response. Similar to $p^t$, For the first execution of operation 605, $P^*_i$ may be assigned an initial value rather than calculated using equation (3). Among other things, the assigned value could be zero or a historical local output power reference value.

After the DER controller 130A determines the local power correction value for DER 120A, process 600 proceeds to operation 605 where the DER controller 130A exchanges power correction values with the other controllers of microgrid 100. Operation 605 may include sharing the local power correction value for DER 120A and receiving remote power correction values for the DER 120B, the DER 120C, and the PCC AC/AC power converter 110 determined by the DER controller 130B, the DER controller 130C, and the PCC controller 111, respectively. The DER controller 130A may receive the remote power correction values directly from the controller that determined the value, or by way of another DER controller or the PCC controller 111. In some embodiments, a DER controller may receive a remote power correction value from another microgrid controller, combine its own local power correction value with the remote power correction value, and then send the aggregate value as a remote power correction value, to a third microgrid controller.

Process 600 proceeds to operation 607 where the DER controller 130A determines a global power correction value as a function of the local power correction value for the DER 120A, as well as the remote power correction values received by the DER controller 130A. The following equation may be used to calculate the global power correction value, where $p^{t+1}$ is the global power correction value, and $\Sigma p_i^{t+1}$ is the sum of available current power correction values, including the local power correction value, and the remote power correction values received by the DER controller 130A. It should be appreciated that sometimes the DER controller 130A, due to an error or malfunction, may not receive remote power correction values from DER controller 130B or DER controller 130C for an iteration. In this case, the DER controller 130A may still complete process 600 to determine a frequency set point for the DER 120A.

$$p^{t+1} = \Sigma p_i^{t+1} \quad (2)$$

After the DER controller 130A determines the global power correction value, the DER controller 130A determines the local output power reference value for DER 120A. For example, the DER controller 130A may use a dual variable cost function represented by the following equation, where $P^*_i$ is the local output power reference value for the DER 120A, $x_i$ is at least one state variable for the DER 120A, and p is the global power correction value.

$$P^*_i = \min f(x_i, p^{t+1}) \quad (3)$$

A state variable for DER 120A may be a voltage, a current, an active power flow, a reactive power flow, or another types of information, such as circuit breaker status, to name but a few examples. Each state variable may include a magnitude, a phase angle, or both. In some embodiments, the cost function is a complex cost function.

After the DER controller 130A determines the local output power reference value for DER 120A, process 600 proceeds to operation 611 where the DER controller 130A determines a frequency set point using the local output power reference value for DER 120A, a droop coefficient for DER 120A, and the output frequency of DER 120A determined during operation 601. The following equation may be used to determine the frequency set point, where $P^*_i$ is the local output power reference value for the DER 120A, $m_{pi}$ is the droop coefficient for the DER 120A, f is the output frequency of DER 120A, and $f_{0i}$ is the frequency set point for the DER 120A.

$$P^*_i = m_{pi}(f - f_{0i}) \quad (4)$$

Among other things, the droop coefficient may be a nominal power (i.e. an averaged power) divided by a frequency range. The droop coefficient may be a fixed value.

After the DER controller 130A determines the frequency set point for the DER 120A during operation 611, the DER controller 130A adjusts the output frequency of the DER 120A to the frequency set point in operation 613. Where a group of DERs or the PCC AC/AC power converter operate according to frequency set points determined by executing process 600 with their respective controllers, the group of devices function as grid-forming nodes for the microgrid 100. In some embodiments, the group act as grid-forming nodes even when the microgrid 100 is coupled to the larger utility grid 101 and is transmitting power between the microgrid 100 and the larger utility grid 101.

Process 600 may be repeated continuously. In some embodiments, operations 601 to 609 are repeatedly performed in a first feedback loop while operations 609 to 613 are performed in a second feedback loop in parallel with the first feedback loop. In some embodiments, the first feedback loop and/or second feedback loop are performed periodically. It should be appreciated that since operations 601 to 609 may be repeatedly perform in a feedback loop, process 600 may begin with any operation in the feedback loop as long as, for the first iteration, any missing values are assigned initial values.

The benefits of operating a microgrid DERs/PCCs using process 600 include power balance and operation optimization. A change in one frequency set point triggers a corresponding change in the output powers of all microgrid DERs during the next iteration of the first feedback loop. Subsequently, the power correction values for each DER/PCC change as a result of the change in output powers, leading to changes in the frequency set points and output power references values for each DER/PCC.

Figure 7:
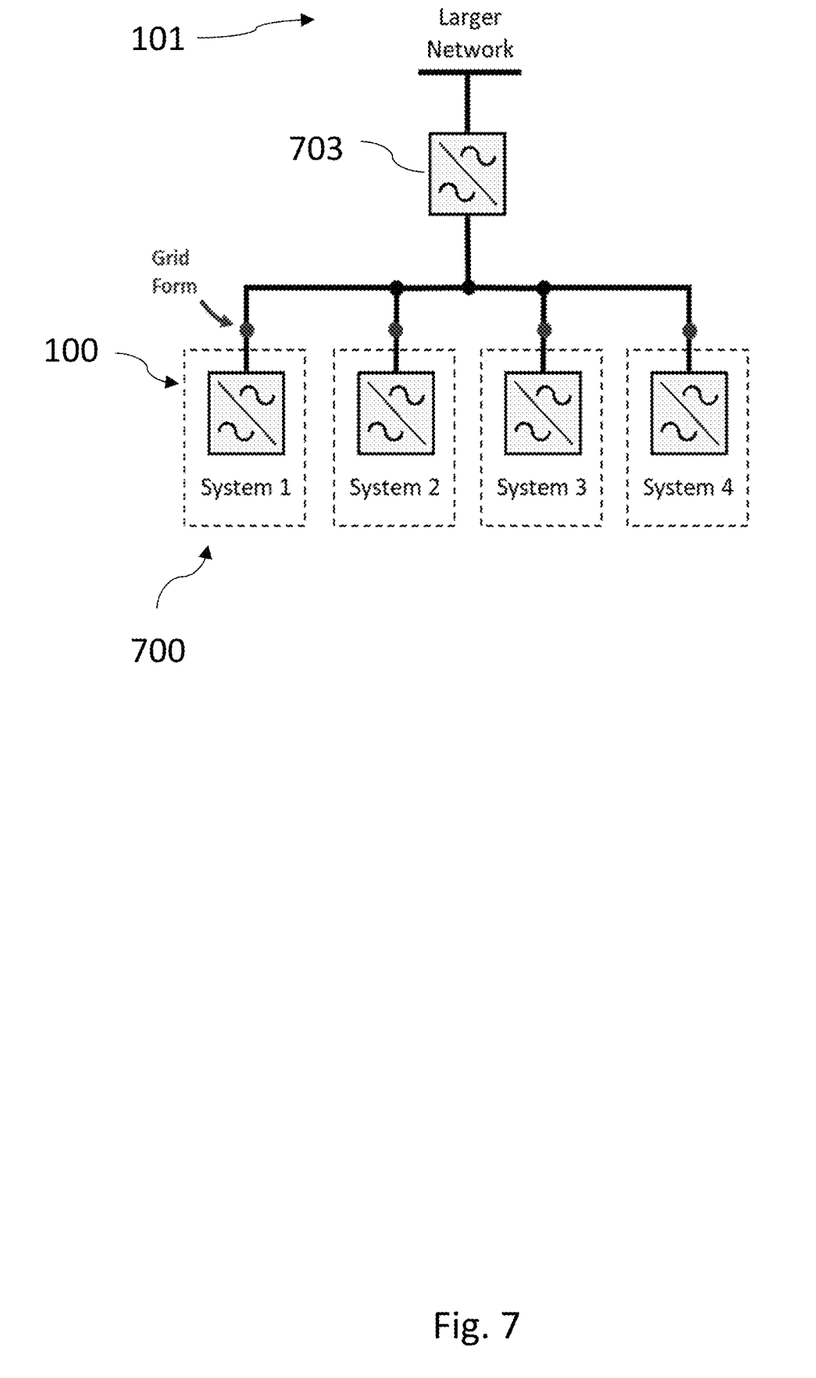
FIG. 7 schematically shows an example of a networked microgrid structure in accordance with various embodiments.

FIG. 7 schematically shows a networked microgrid structure 700 configured to grid-form in a manner similar to the microgrid 100 of FIG. 5. The networked microgrid structured 700 includes the microgrid 100 as well as a plurality of other microgrids 100, each including microgrid controllers configured to grid-form according to process 600 in FIG. 6.

The networked microgrid structure 700 has a PCC AC/AC power converter 703 configured to control the power transmitted between the larger utility grid 101 and the networked microgrid structured 700 according to process 600 in FIG. 6.

In this way, the PCC AC/AC power converter 703 and the plurality of microgrids 100 all act as grid-forming nodes, thereby avoiding a need for a single grid-forming node within the networked microgrid structure 700. While FIG. 5 and FIG. 6 illustrated a grid-forming technique using microgrid DERs and a PCC A/C power converter, it should be appreciated that networked microgrids may all operate using the grid-forming process 600 in FIG. 6, along with the PCC AC/AC power converter 703, to form a larger subsystem capable of grid-forming without centralized control or a single grid forming node. It should be further appreciated that the techniques described herein may be scaled to such an extent that an entire utility grid is grid-formed using process 600 executed by DER controllers and PCC controllers.

Figure 8:
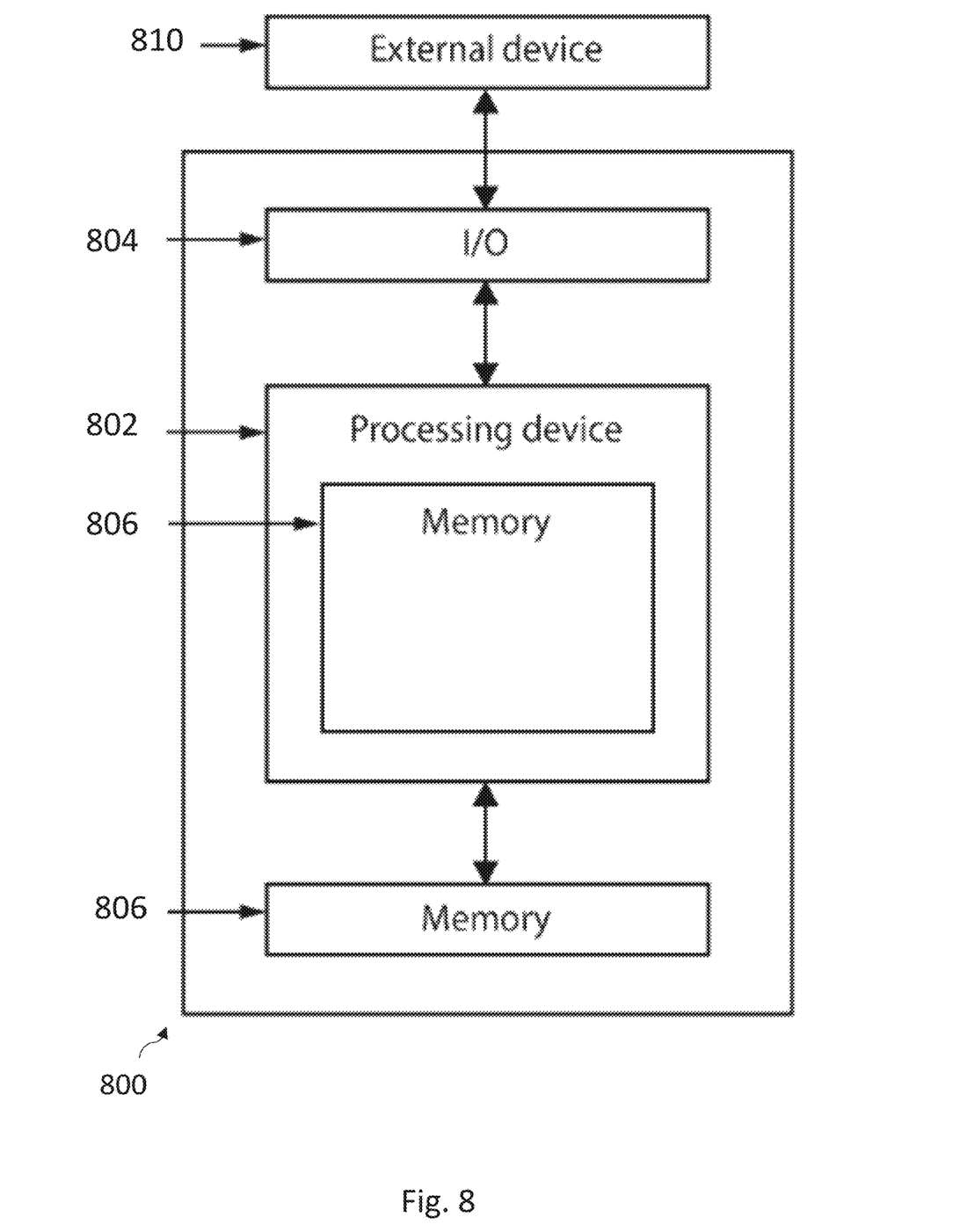
FIG. 8 schematically shows an example of a computing device in accordance with various embodiments.

FIG. 8 shows a schematic block diagram of a computing device 800. The computing device 800 is one example of a PCC controller or DER controller, which is used, in various embodiments, in connection with the utility grid 101 and the microgrid 100. The computing device 800 includes at least one processing device 802, at least one input/output device 804, and at least one memory device 806. The computing device 800 may be a stand-alone device, an embedded system, or a plurality of devices configured to perform the functions described with respect to the PCC controller and DER controllers of microgrid 100. Furthermore, computing device 800 may communicate with one or more external devices 810.

The input/output device 804 enables the computing device 800 to communicate with the external device 810. For example, the input/output device 804 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. The input/output device 804 may be comprised of hardware, software, or firmware. It is contemplated that the input/output device 804 includes more than one of these adapters, credentials, or ports, such as a first port for receiving data and a second port for transmitting data.

The external device 810 may be any type of device that allows data to be input to or output from the computing device 800. For example, the external device 810 may be a PCC controller, a DER controller, a mobile device, a reader device, equipment, a handheld computer, a diagnostic tool, a controller, a computer, a server, a printer, a display, an alarm, a visual indicator, a keyboard, a mouse, a user device, a cloud device, a circuit, or a touch screen display. Furthermore, it is contemplated that the external device 810 is integrated into computing device 800. It is further contemplated that more than one external device is in communication with the computing device 800.

The processing device 802 in various embodiments is a programmable type, a dedicated, hardwired state machine, or a combination thereof. The processing device 802 may further include multiple processors, Arithmetic-Logic Units (ALUs), Central Processing Units (CPUs), Digital Signal Processors (DSPs), or Field-programmable Gate Array (FPGA), to name but a few examples. For forms of the processing device 802 with multiple processing units, distributed, pipelined, or parallel processing may be used as appropriate. The processing device 802 may be dedicated to performance of just the operations described herein or may be utilized in one or more additional applications. In the illustrated form, the processing device 802 is of a programmable variety that executes processes and processes data in accordance with programming instructions (such as software or firmware) stored in the memory device 806. Alternatively or additionally, programming instructions may be at least partially defined by hardwired logic or other hardware. The processing device 802 may be comprised of one or more components of any type suitable to process the signals received from the input/output device 804 or elsewhere, and provide desired output signals. Such components may include digital circuitry, analog circuitry, or a combination of both.

The memory device 806 in different embodiments is of one or more types, such as a solid-state variety, electromagnetic variety, optical variety, or a combination of these forms, to name but a few examples. Furthermore, the memory device 806 may be volatile, nonvolatile, transitory, non-transitory or a combination of these types, and some or all of the memory device 806 may be of a portable variety, such as a disk, tape, memory stick, cartridge, to name but a few examples. In addition, the memory device 806 may store data that is manipulated by the processing device 802, such as data representative of signals received from or sent to the input/output device 804 in addition to or in lieu of storing programming instructions, to name but a few examples. As shown in FIG. 8, the memory device 806 may be included with the processing device 802 or coupled to the processing device 802, but need not be included with both.

Figure 9:
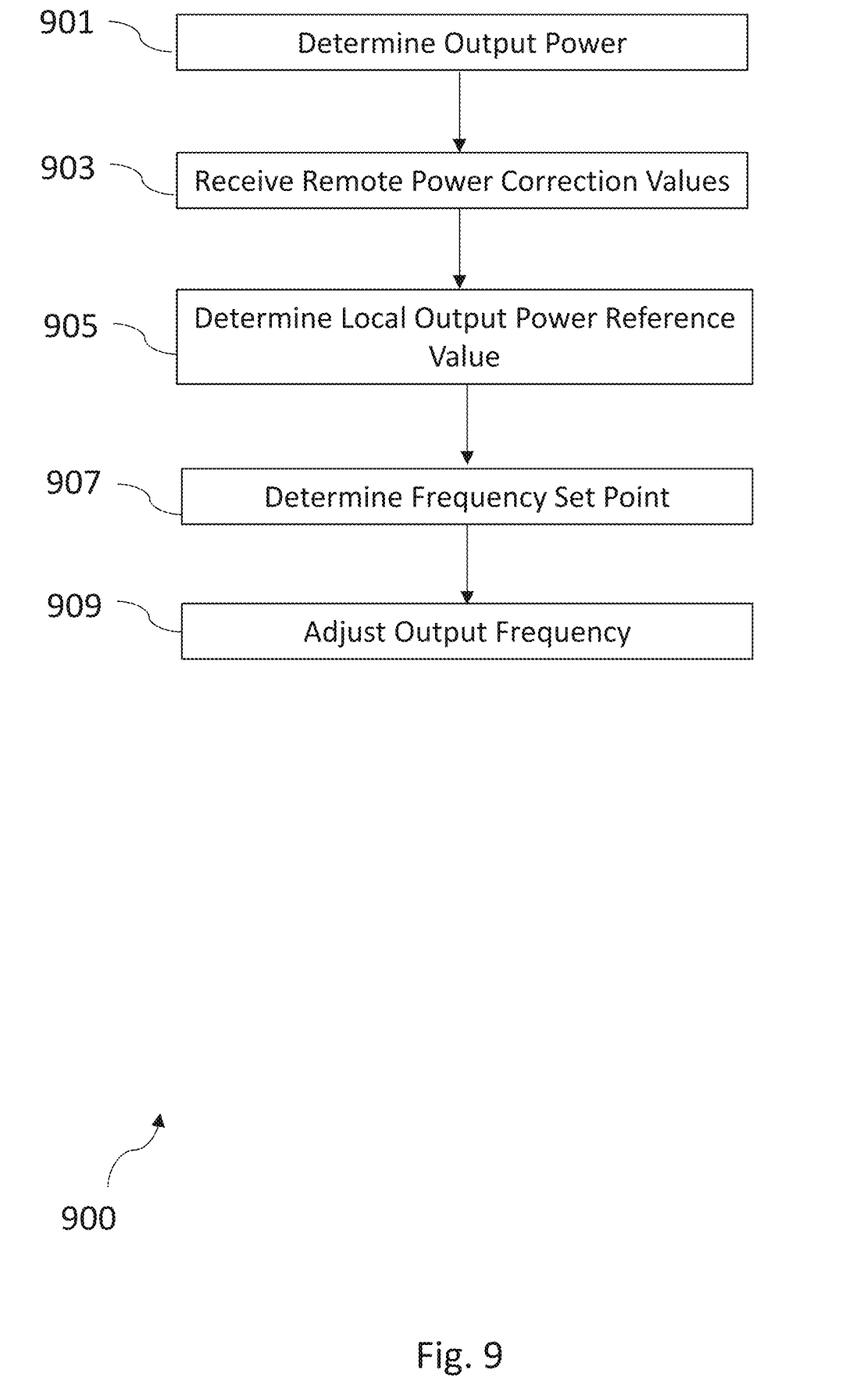
FIG. 9 shows an example of a process for controlling a power system in accordance with various embodiments.

FIG. 9 shows a process 900 for controlling a power system, such as the microgrid 100 of FIG. 5 or the networked microgrid structure 300, in accordance with various embodiments. While process 900 is described below as implemented by the DER controller 130, process 900 may be performed simultaneously by the DER controllers 130A, 130B, and 130C and PCC controller 111 of microgrid 100. It shall be further appreciated that a number of variations and modifications to process 900 are contemplated including, for example, the omission of one or more aspects of process 900, the addition of further conditionals and operations, or the reorganization or separation of operations and conditionals into separate processes. It should be appreciated that features analogous to features of process 600 may be added to process 900.

Process 900 begins at operation 901 where the DER controller 130A determines an output power value of a DER. The output power value may include an active power value having a magnitude and/or a phase angle of the power output by the DER 120. The output power value may also include an output frequency of the power output by the DER 120.

Process 900 proceeds to operation 903 where the DER controller 130A receives a remote power correction value from the DER controller 130B.

Process 900 proceeds to operation 905 where the DER controller 130A determines a local output power reference value as a function of the active power value and the remote power correction value received from the DER controller 130B. The local output power reference value corresponds to a desired active power to be output by DER 120. In some embodiments, the DER controller 130A determines a local output power reference value using an iteration of equations (1)-(3) above.

Process 900 proceeds to operation 907 where the DER controller 130A determines a frequency set point for the DER 120 as a function of the local output power reference value and a droop coefficient. In some embodiments, the DER controller 130A determines the frequency set point using equation (4) above.

Process 900 proceeds to operation 909 where the DER controller 130Aadjusts the output frequency of the DER 120 to the frequency set point.

It should be appreciated that any or all of the foregoing features of process 900 may also be present in the other processes disclosed herein.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow.

In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" or "a portion" is used, the item can include a portion or the entire item unless specifically stated to the contrary. Unless stated explicitly to the contrary, the terms "or" and "and/or" in a list of two or more list items may connote an individual list item, or a combination of list items. Unless stated explicitly to the contrary, the transitional terms "having" and its derivatives are open-ended terminology, bearing the same meaning as the transitional term "comprising."

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims. It shall nevertheless be understood that no limitation of the scope of the present disclosure is hereby created, and that the present disclosure includes and protects such alterations, modifications, and further applications of the exemplary embodiments as would occur to one skilled in the art with the benefit of the present disclosure.

What is claimed is:

1. A method for operating a microgrid, comprising:
   determining, with a first distributed energy resource (DER) controller, an output power value of a first DER;
   determining a local power correction value as a function of the output power value and a previous local output power reference value;
   transmitting the local power correction value to a second DER controller of a second DER;
   receiving, with the first DER controller, a remote power correction value from the second DER controller;
   determining, with the first DER controller, a local output power reference value as a function of the output power value and the remote power correction value;
   determining, with the second DER controller, a second local output power reference value as a function of an output power of the second DER and the local power correction value from the first DER controller;
   determining, with the first DER controller, a first frequency set point as a function of the local output power reference value and a droop coefficient;
   determining, with the second DER controller, a second frequency set point as a function of the second local output power reference value and a second droop coefficient;
   adjusting, with the first DER controller, a first output frequency of the first DER as a function of the first frequency set point;
   adjusting, with the second DER controller, a second output frequency for the second DER as a function of the second frequency set point; and
   operating, with the second DER controller, the second DER of the microgrid using the second output frequency while operating, with the first DER controller, the first DER of the microgrid using the first output frequency.

2. The method of claim 1, wherein determining the local output power reference value includes:
   determining a global power correction value as a function of a local power correction value and the remote power correction value; and
   determining the local output power reference value as a function of the global power correction value and the output power value.

3. The method of claim 1, wherein adjusting the first output frequency and adjusting the second output frequency includes operating the first DER according to the first frequency set point and operating the second DER according to the second frequency set point.

4. The method of claim 3, comprising:
   transmitting, using a point of common coupling power converter, power between the microgrid and a power system,
   wherein adjusting the first output frequency and adjusting the second output frequency occurs while transmitting power between the microgrid and a utility grid.

5. The method of claim 1, wherein determining the first frequency set point includes using the following equation, $$P^*_i = m_{pi}(f - f_{0i})$$

where $P^*_i$ is the local output power reference value, $m_{pi}$ is the droop coefficient, f is the first output frequency of the first DER, and $f_{0i}$ is the first frequency set point.

6. A system, comprising:
   a first distributed energy resource (DER) controller of a first DER, comprising:
      an input/output device configured to communicate with a plurality of microgrid controllers,
      at least one processing device, and
      a memory device configured to store instructions that, when executed by the at least one processing device, are configured to:
         determine an output power value of the first DER,
         determine a local power correction value as a function of the output power value and a previous local output power reference value,
         transmit the local power correction value to the second DER controller, receive a remote power correction value from a second DER controller, determine a local output power reference value as a function of the output power value and the remote power correction value, determine a first frequency set point as a function of the local output power reference value and a droop coefficient, and adjust first output frequency of the first DER as a function of the first frequency set point, and the second DER controller of a second DER, wherein the second DER controller is configured to:

determine a second local output power reference value as a function of an output power of the second DER and the local power correction value from the first DER controller, determine a second frequency set point as a function of the second local output power reference value and a second droop coefficient, and adjust a second output frequency for the second DER as a function of the second frequency set point;

wherein adjusting the first output frequency and adjusting the second output frequency includes operating the first DER according to the first frequency set point and operating the second DER according to the second frequency set point.

7. The system of claim 6, wherein determining the local output power reference value includes:

determining a global power correction value as a function of a local power correction value and the remote power correction value; and determining the local output power reference value as a function of the global power correction value and the output power value.

8. The system of claim 5, comprising:

a point of common coupling power converter, configured to transmit power between the microgrid and a power system, wherein adjusting the first output frequency and adjusting the second output frequency occurs while the common coupling power converter is transmitting power between the microgrid and the power system.

9. The system of claim 6, wherein:

the remote power correction value includes an aggregation of a plurality of power correction values determined by a plurality of DER controllers including the second DER controller.

10. The system of claim 6, wherein determining the first frequency set point includes using the following equation, $$P^*_i = m_{pi}(f - f_{0i})$$

where $P^*_i$ is the local output power reference value, $m_{pi}$ is the droop coefficient, f is the first output frequency of the first DER, and $f_{0i}$ is the first frequency set point.

11. A computer program product for use on a computer system for operating a microgrid, the computer program product comprising a tangible, non-transient computer usable medium having computer readable program code thereon, the computer readable program code comprising:

program code for program code for determining, with a first distributed energy resource (DER) controller, an output power value of a first DER;

program code for determining a local power correction value as a function of the output power value and a previous local output power reference value;

program code for transmitting the local power correction value to a second DER controller of a second DER;

program code for receiving, with the first DER controller, a remote power correction value from a second DER controller;

program code for determining, with the first DER controller, a local output power reference value as a function of the output power value and the remote power correction value;

program code for determining, with the second DER controller, a second local output power reference value as a function of an output power of the second DER and the local power correction value from the first DER controller;

program code for determining, with the first DER controller, a first frequency set point as a function of the local output power reference value and a droop coefficient;

program code for determining, with the second DER controller, a second frequency set point as a function of the second local output power reference value and a second droop coefficient;

program code for adjusting, with the first DER controller, a first output frequency of the first DER as a function of the first frequency set point program code for adjusting, with the second DER controller, a second output frequency for the second DER as a function of the second frequency set point; and program code for operating, with the second DER controller, the second DER of the microgrid using the second output frequency while operating, with the first DER controller, the first DER of the microgrid using the first output frequency.

12. The computer program product of claim 11 wherein the program code for determining the local output power reference value includes:

determining a global power correction value as a function of a local power correction value and the remote power correction value; and determining the local output power reference value as a function of the global power correction value and the output power value.

13. The computer program product of claim 11, wherein the program code for adjusting the first output frequency includes operating the first DER according to the first frequency set point.

14. The computer program product of claim 11, comprising:

program code for adjusting the first output frequency while the microgrid is electrically coupled to a utility grid.

15. The computer program product of claim 11, wherein program code determining the first frequency set point includes the following equation, $$P^*_i = m_{pi}(f - f_{0i})$$

where $P^*_i$ is the local output power reference value, $m_{pi}$ is the droop coefficient, f is the first output frequency of the first DER, and $f_{0i}$ is the first frequency set point.

* * * * *